(12) United States Patent  
Berg et al.

(10) Patent No.: US 6,913,148 B2  
(45) Date of Patent: Jul. 5, 2005

(54) SEALABLE COVER DEVICE

(75) Inventors: Finn Berg, Lillesand (NO); Tor Andersen, Rykkin (NO)

(73) Assignee: Smartbox AS (NO)

( * ) Notice: Subject to any disclaimer, the term of this patent is extended or adjusted under 35 U.S.C. 154(b) by 0 days.

(21) Appl. No.: 10/491,329

(22) PCT Filed: Oct. 9, 2002

(86) PCT No.: PCT/NO02/00365

§ 371 (c)(1),  
(2), (4) Date: Apr. 1, 2004

(87) PCT Pub. No.: WO03/032320

PCT Pub. Date: Apr. 17, 2003

(65) Prior Publication Data

US 2005/0011782 A1 Jan. 20, 2005

(30) Foreign Application Priority Data

Oct. 12, 2001 (NO) .......................................... 2001 4955

(51) Int. Cl.[7] .............................................. B65D 85/57
(52) U.S. Cl. .................... 206/493; 206/308.1; 220/324; 220/345.2; 312/9.48; 312/303
(58) Field of Search ................................ 206/303, 307, 206/308.1, 308.3, 310, 387.13, 493; 220/345.1–345.3; 312/9.47, 9.48, 9.58, 9.64, 302, 303

(56) References Cited

U.S. PATENT DOCUMENTS

| | | | | | |
|---|---|---|---|---|---|
| 4,760,502 A | * | 7/1988 | Ackeret | ....................... | 362/86 |
| 4,875,584 A | * | 10/1989 | Ackeret | ................ | 206/387.12 |
| 4,899,875 A | | 2/1990 | Herr et al. | | |
| 5,363,960 A | * | 11/1994 | Ackeret | ................ | 206/387.12 |
| 5,697,499 A | * | 12/1997 | Reiter | ..................... | 206/308.1 |
| 5,842,563 A | * | 12/1998 | Herr et al. | ............... | 206/308.1 |
| 5,984,093 A | * | 11/1999 | Frick | ...................... | 206/308.1 |

FOREIGN PATENT DOCUMENTS

| | | |
|---|---|---|
| NO | 179848 B | 9/1996 |
| WO | 98/14391 A1 | 4/1998 |

* cited by examiner

*Primary Examiner*—Jim Foster  
(74) *Attorney, Agent, or Firm*—Nixon & Vanderhye PC (57) ABSTRACT

A cover device or the storing of an object, comprising a cover moulding/housing/case and a drawer movable in the cover moulding, in which, with the drawer in its closed/pushed-in position, a sealing hook connected to the drawer bears lockingly against a breakable sealing bow connected to the cover moulding. The drawer includes a main plate extending inwards into the cover moulding and a pivotable deflecting plate extending outwards, elastically connected to the main plate.

4 Claims, 8 Drawing Sheets

SEALABLE COVER DEVICE

This application is the U.S. national phase of international application PCT/NO02/00365 filed in English on 9 Oct. 2002, which designated the U.S. PCT/NO02/00365 claims priority to NO Application No. 20014955 filed 12 Oct. 2001. The entire contents of these applications are incorporated herein by reference.

This invention relates to a cover provided with a drawer, the cover being provided with a sealing device which is broken as the drawer is opened. The drawer is of such configuration that it may be elastically bent to achieve easier access to the content of the cover. The cover is particularly suitable as sales packaging for compact discs (CDs).

In the marketing of a product that lies accessible to the customer at the place of selling, it may be necessary to ensure that the product cannot be removed from the packaging and possibly be replaced by, for example, a used or damaged product. Thus it is common that CDs, for example, are removed from the packaging and stored separately until being sold.

According to known technique the CD cover is wrapped in a Cellophane™-like foil as a seal. The foil is broken as the cover is opened. Such foil has little resistance to mechanical loads and may easily be damaged.

The invention has as its object to remedy the drawbacks of known technique.

The object is realized according to the invention through the features set forth in the description below and in the following claims.

A cover is moulded for example from a suitable plastic material as a plate-like moulding with folding edges. By first folding up the two opposite guiding sides from the bottom plate section, and then the rear wall and lid, a pocket-shaped cover with one open side is formed. The two guiding sides are each provided with a longitudinal guide groove. A drawer fits complementarily into the guide grooves and is arranged to be moved closingly into the pocket-shaped cover.

The drawer is provided with a suitable recess/bed for the product which it is going to serve as packaging for.

In connection with the guides of the drawer is arranged a sealing hook, which engages a sealing bow in the connecting side wall when the drawer is pushed all the way into the cover. The sealing hook is arranged in such a way that it cannot be unhooked from the sealing bow, and the sealing bow is thus torn from the cover as the drawer is opened.

Thereby it may easily be established whether the packaging has been opened.

As the drawer is being pulled out of the cover, a stopper resiliently connected to the drawer slides along the guide groove of the side edge. The resilient bearing of the stopper against the guide groove has a braking effect on the movement of the drawer within the cover. As the drawer is pulled out into a predetermined position in the cover, the stopper comes to abut a dog, thereby preventing the drawer from being pulled all the way out of the cover.

To facilitate the removal of the content of the cover, the portion of the drawer projecting in the open position, is arranged to be bent elastically downwards. The content of the cover will thus be uncovered more and thereby be more easily gripable.

In the following will be described a non-limiting example of a preferred embodiment which is visualized in the accompanying drawings, in which:

FIG. 7 shows the same as FIG. 6, but here the drawer has been pushed all the way in.

In the drawings the reference numeral 1 indicates a cover comprising a cover moulding 2 and a drawer 4. The cover moulding 2 comprises a bottom plate 6, a first side plate 8, a second side plate 10, a rear wall 12 and a top plate/lid 14.

Figure 1:
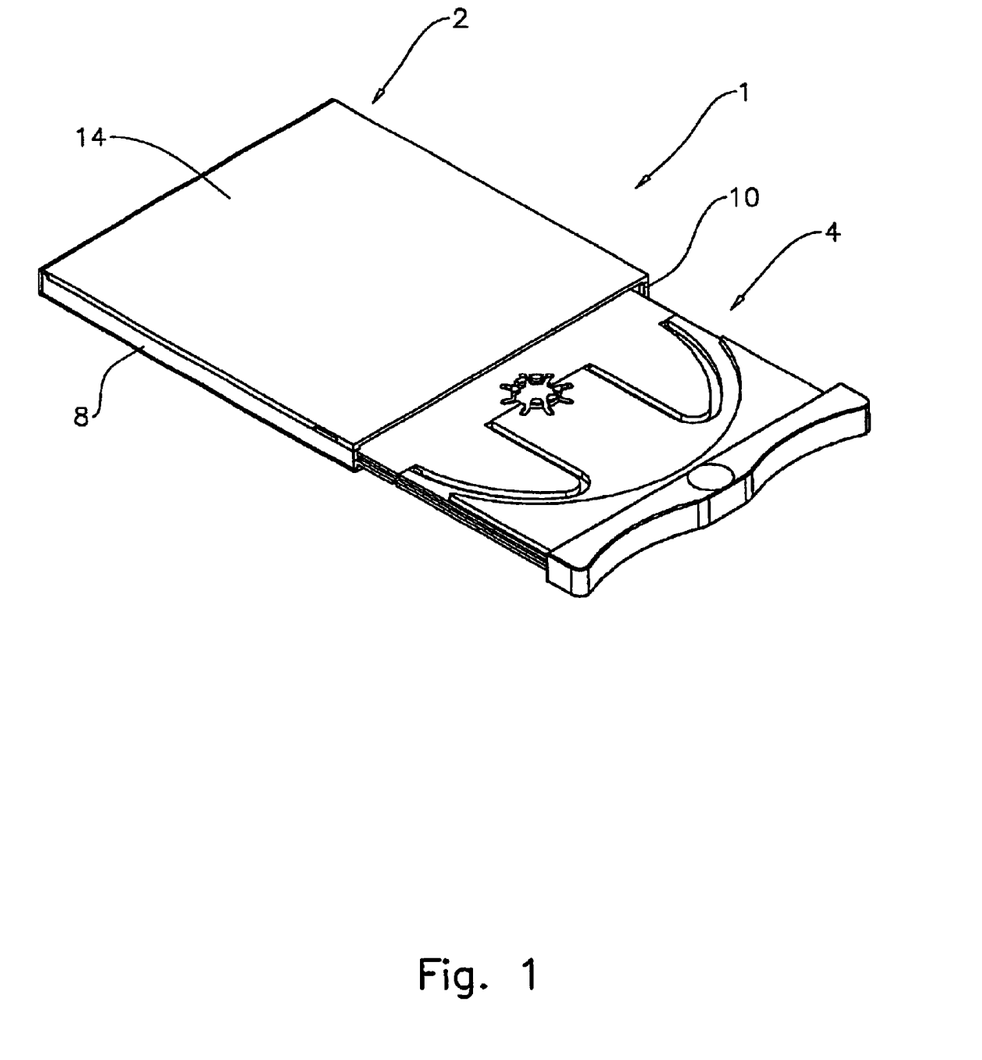
FIG. 1 shows a cover with a drawer, in which the drawer is in a pulled out, open position.
Figure 2:
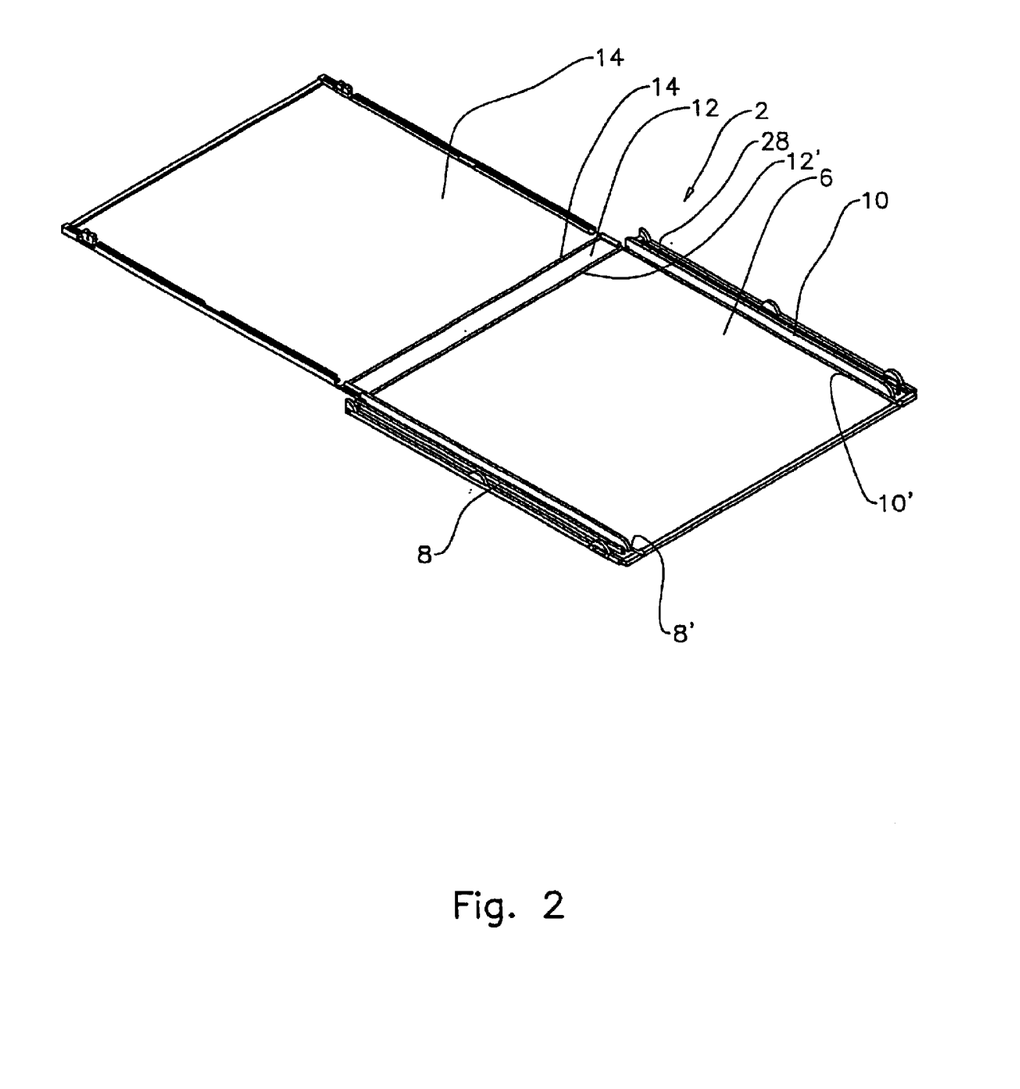
FIG. 2 shows the cover in its moulded state before folding.
Figure 3:
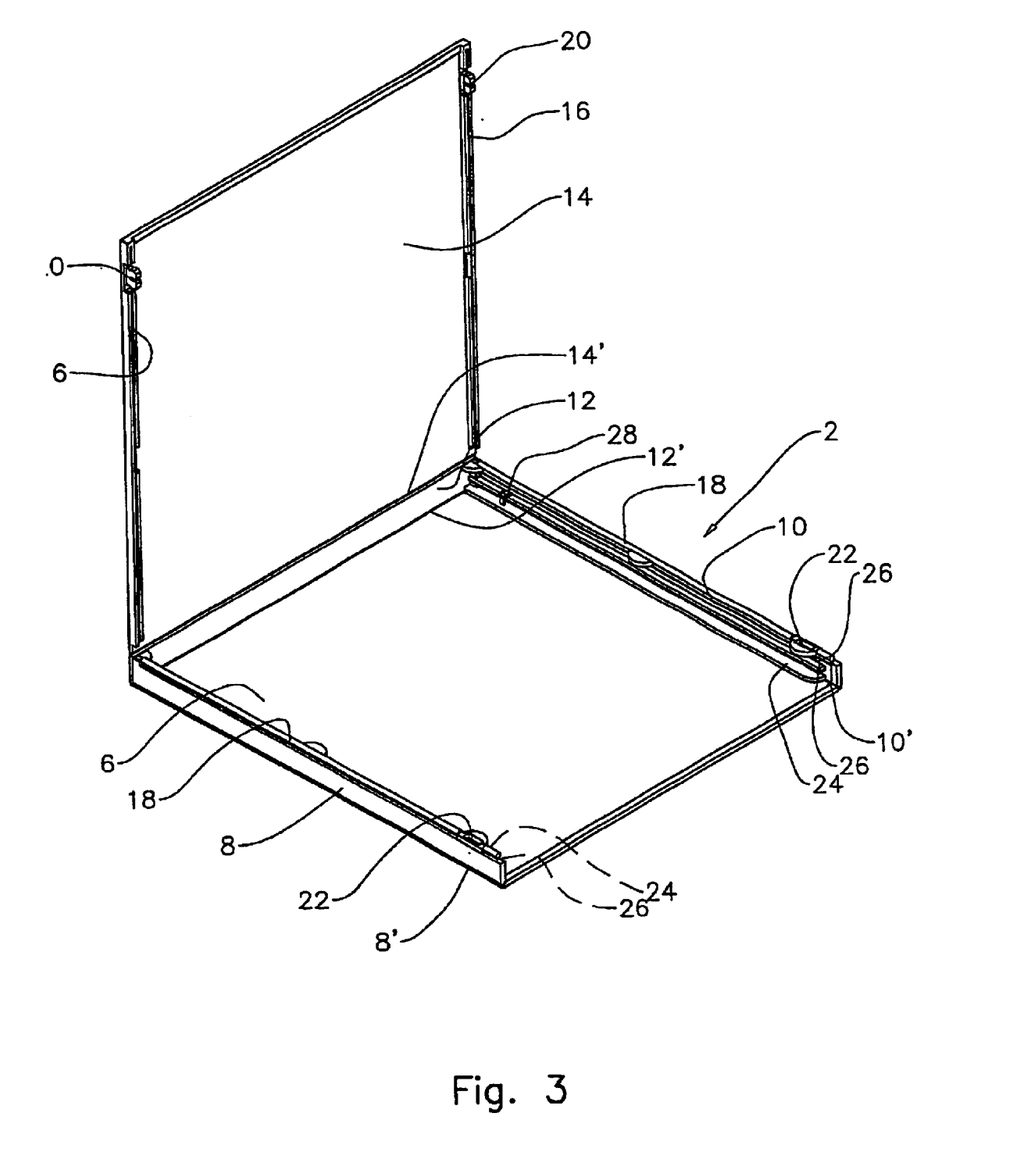
FIG. 3 shows the cover after the side edges and the rear wall have been folded up, but before the lid of the cover is closed.

The cover moulding 2 is provided with weakened folding lines, a folding line 8' forming a fold when the first side plate 8 is folded up from its moulded position, see FIG. 2, into its working position, see FIG. 3. Correspondingly, the second side wall 10 is folded along a folding line 10', the rear wall 12 is folded up along a folding line 12' and the top plate 14 is folded along a folding line 14'.

Along two of its side edges, the top plate 12 is provided with grooves 16 that correspond to upward-projecting strips 18 of the side plates 8 and 10, respectively, see FIG. 3. As the cover 1 is folded, the strips 18 are forced into their respective grooves 16.

To prevent inadvertent opening of the top plate 12, the top plate 12 is provided with two snap-locks 20 which interlock unreleasably with corresponding fasteners 22 in the side walls 8 and 10 as the cover moulding 2 is folded.

Each of the side plates 8 and 10 is provided with a guide groove 24 for the drawer 4 and a dog 26. In the side plate 10 is arranged a sealing bow 28.

Figure 4:
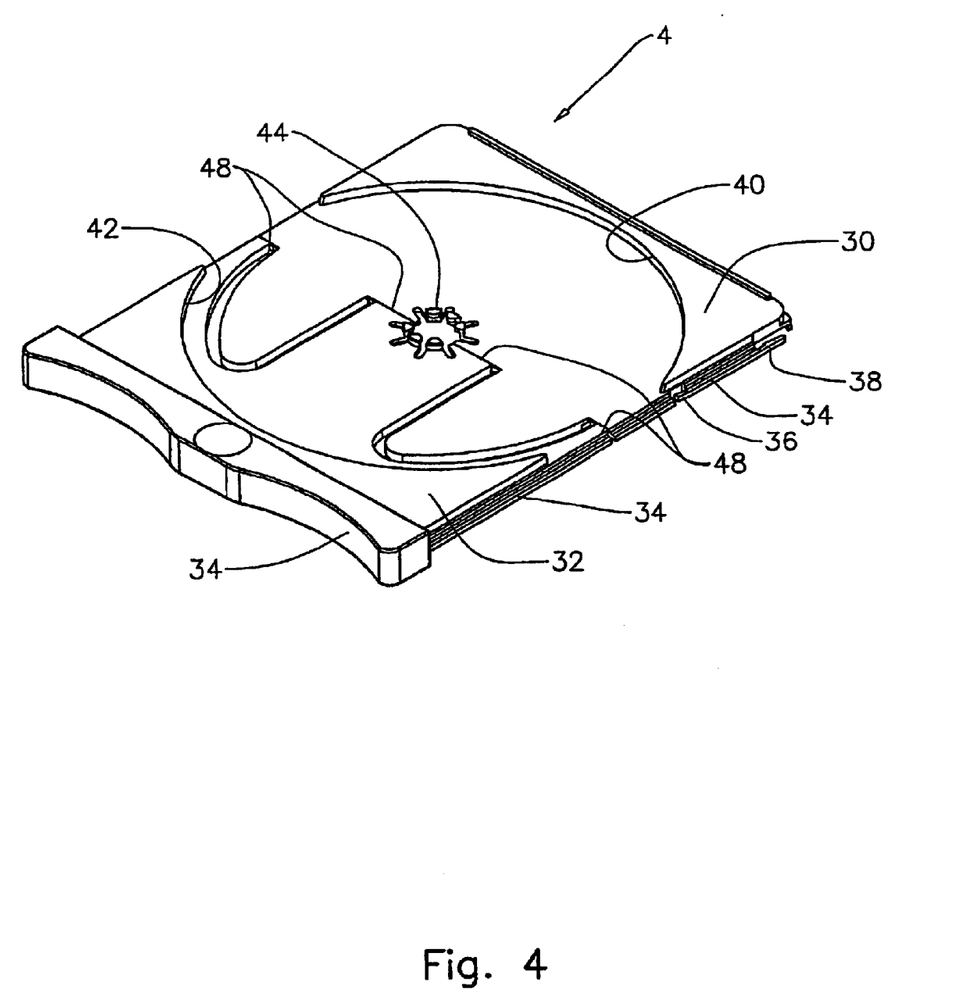
FIG. 4 shows the drawer.

The drawer 4 comprises a main plate 30 and a deflecting plate 32 with a drawer front 34, see FIG. 4. Along their side edges, the main plate 30 and the deflecting plate 32 are provided with strips 34 which fit complementarily into the guide grooves 24 of the side walls 8, 10. The strips 34 include a resilient stopper 36.

Figure 7:
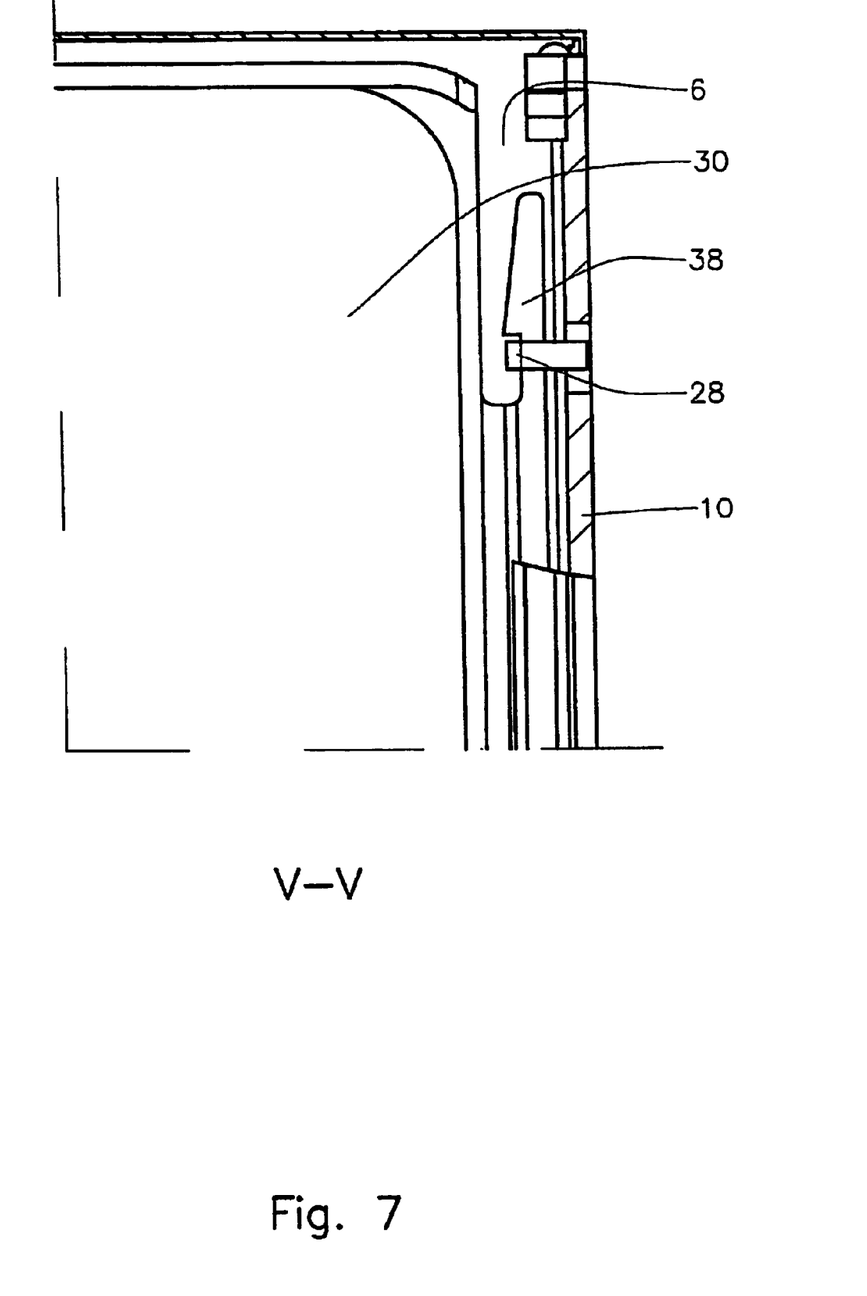

In the side edge of the main plate 30 opposite that of the second side plate 10 is arranged a sealing hook 38. The sealing hook 38 is resiliently connected to the main plate 30. The sealing bow 28 is arranged to swing in behind the sealing hook 38 when the drawer is in its closed position, see FIG. 7. As the drawer 4 is opened, the sealing bow 28 is being broken, thereby no longer locking the drawer 4 in its closed position in the cover moulding 2.

The stoppers 36 are resiliently connected to the strips 34 of the main plate 30. The stopper resiliently bears against the guide groove 24, thereby having a braking effect on the movement of the drawer 4 in the cover moulding 2. As the drawer is pulled out into a predetermined position, the stoppers 36 come to abut their respective dogs 26 in the side plates 8 and 10, thereby preventing the drawer 4 from being pulled all the way out of the cover moulding 2.

The main plate 30 of the drawer 4 and the deflecting plate 32 are formed with recesses 40 and 42 and a support 44 adapted for a CD 46, see FIG. 4.

The deflecting plate 32 is pivotably connected to the main plate 30 by means of a resilient, possibly sectional connecting groove 48, in which the material thickness has been reduced compared to the material thickness of the main plate 30.

Figure 8:
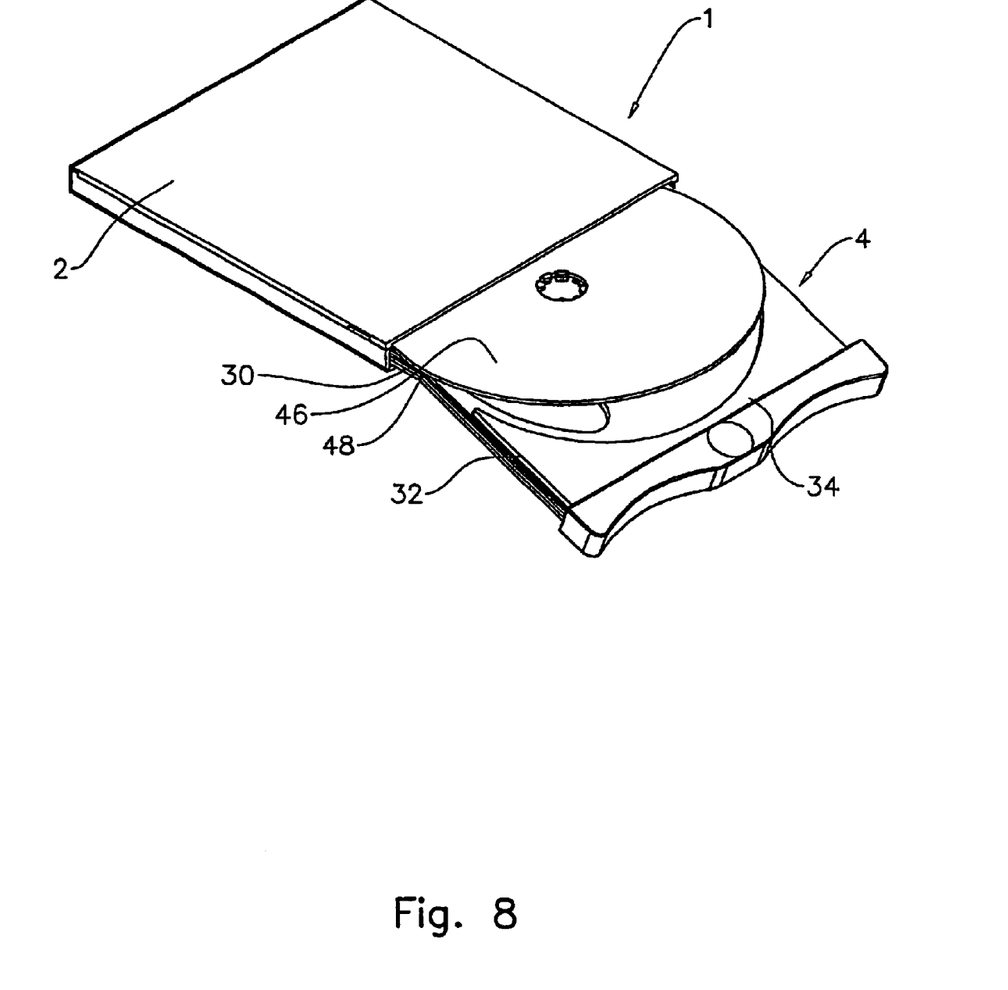
FIG. 8 shows the cover with the drawer in the open position and with a CD placed in the drawer, the outer portion of the drawer having been bent downwards.

When, with the drawer 4 open, the drawer front 34 is pressed down, the deflecting plate 32 and the drawer front 34 pivot elastically about the connecting groove 48, so that the access to the CD 46 is substantially improved, see FIG. 8. When the drawer front 34 is unloaded, the deflecting plate 32 and the drawer front 34 pivot back into their initial position.

A more detailed description of the support 44 as shown in FIGS. 1, 4, 5 and 8 will follow. The support 44 is made up by a number of well known snapping elements 44a. Each snapping element 44a is fixed to a projecting and flexing limb 44b. Each snapping element 44a projects upwardly and has a tiny notch or hook 44c facing outwardly. The snapping elements 44a define together an outer diameter that is slightly larger than the diameter of a central hole in the object or disc 46. When this central hole is placed over the projecting snapping elements 44a, each element is forced inwardly, which is enabled by flexing of the limb 44b. When the rim of the central hole passes into the respective notches 44c each element 44a flexes back and snaps into place and fixes the object or disc 46 to the support 44. All the above is common prior art.

Figure 5:
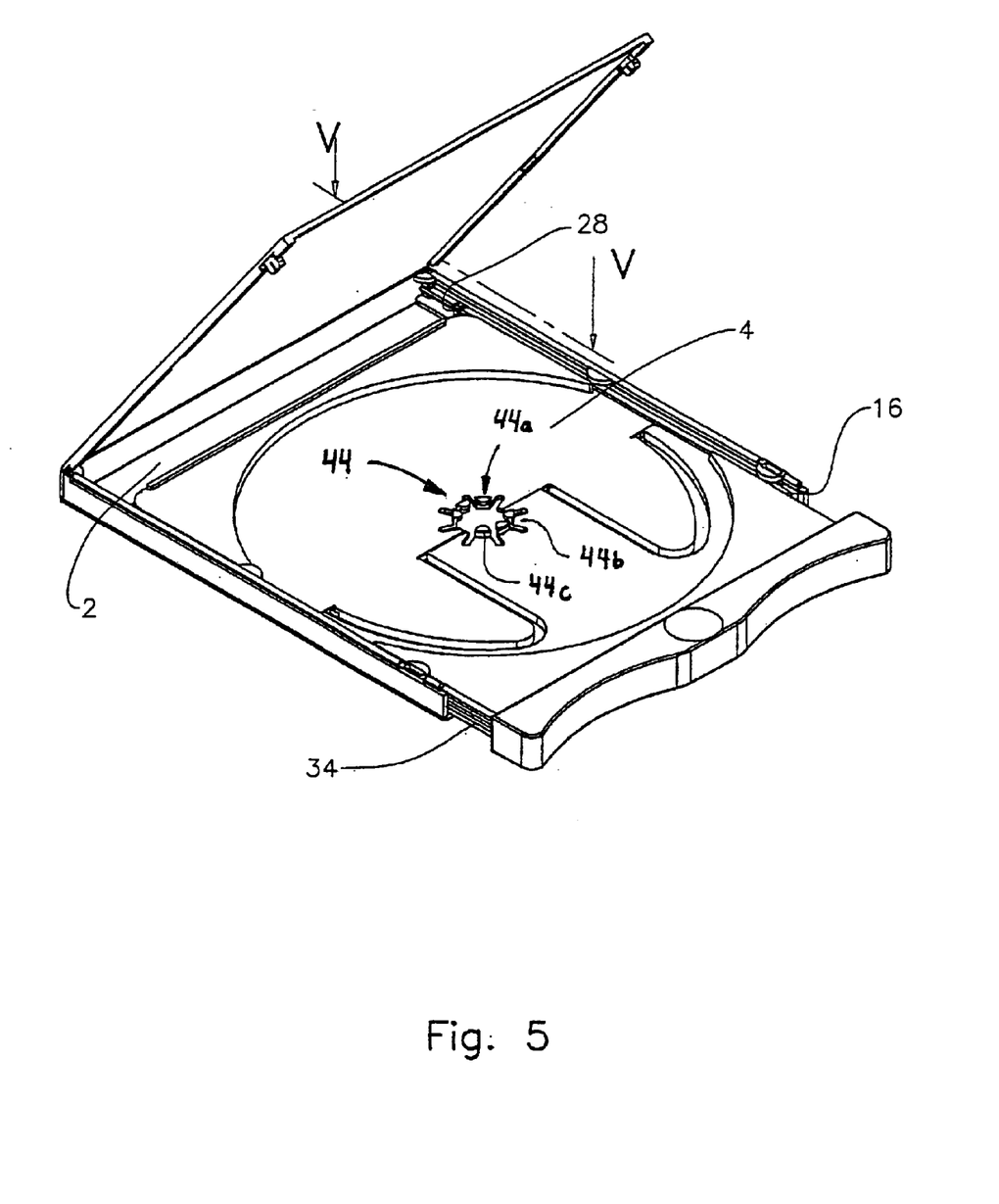
FIG. 5 shows the drawer in a position almost completely pushed in. The top plate is open to show the drawer.
Figure 6:
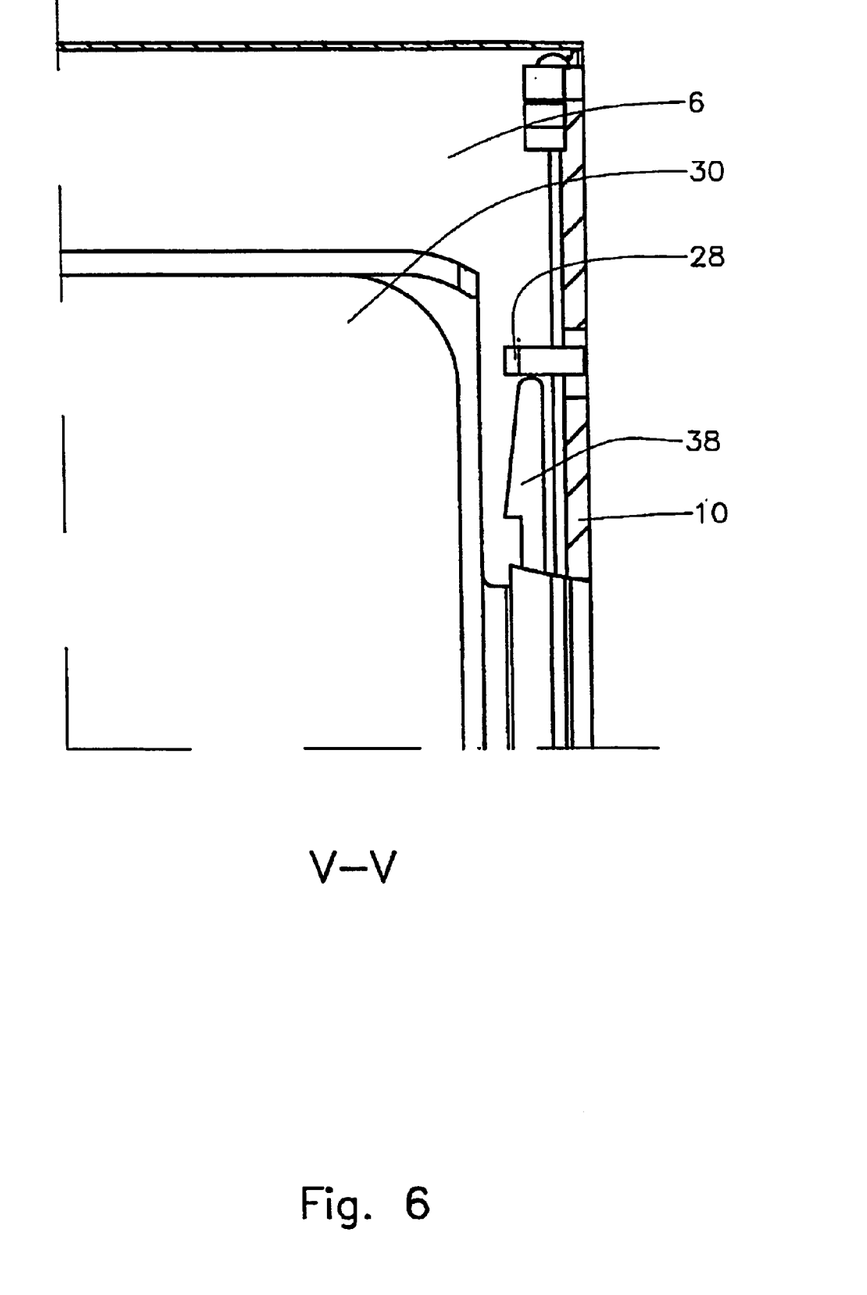
FIG. 6 shows, on a larger scale, a section V—V of FIG. 5.

The difference between the prior art and the new support 44 is that the connecting groove 48, which constitutes the pivot axis for the deflecting plate 32, is passing transversally and diametrically through the support 44 and the projecting snapping elements 44a at each side of the central hole and in line with the connecting groove 48 are omit, as clearly shown in FIGS. 4 and 5.

This is done to more easily enable the release of the snapping elements 44a from the central hole when the plate 32 is deflected. As shown in FIG. 8, when deflecting the plate 32, those snapping elements 44a that are part of, or integrated with the deflecting plate 32 will release, or snap out from the central hole while the elements 44 that are part of the main plate 30 will remain within the central hole.

Thus, after having pulled the deflecting plate 32 down, the disc 46 is actually released from the support 44.

Moreover, due to the resiliency of the drawer material along the connecting groove 48, the plate 32 is resiliently pivoting back again when let loose and the three snapping elements 44a hit the bottom surface (not the hole) of the disc 46. Thus they elevate the disc 46 slightly up from the drawer bottom and make possible a convenient and easy diametrical finger grasp of the disc 46.

Traditionally, with the prior 8 elements stiff support, you have to wriggle and use some force before the disc gets loose from the support.

What is claimed is:

1. A cover device for the storing of an object comprising a cover moulding/housing/case and a drawer movable in the cover moulding, which drawer includes a main plate extending inwards into the cover moulding and a pivotable deflecting plate extending outwards, said deflecting plate being elastically connected to the main plate along a connecting groove which has a reduced material thickness compared to the material thickness of the main plate, characterized in that a deflectable object support is centrally located in the drawer, which object support is made up by a number of per se known snapping elements being partly integrated with the main plate and partly integrated with the deflecting plate such that a part of the object support is arranged to follow the pivotable deflecting plate when the deflecting plate is deflected in a direction away from the object, thus enabling release of the object from the support.

2. The cover device according to claim 1, characterized in that the main plate includes integrated projecting rigid lobes to further support the object to the main plate.

3. The cover device according to claim 1, characterized in that the connecting groove is sectioned.

4. The cover device according to claim 1, characterized in that the drawer includes a hook connected to the drawer, which hook, before use, bears lockingly against a breakable sealing bow connected to the cover moulding.

* * * * *